United States Patent
Meng et al.

(10) Patent No.: US 12,041,080 B2
(45) Date of Patent: Jul. 16, 2024

(54) PERSISTENT DEVICE IDENTIFIER DRIVEN COMPROMISED DEVICE QUARANTINE

(71) Applicant: Palo Alto Networks, Inc., Santa Clara, CA (US)

(72) Inventors: Li Meng, San Jose, CA (US); Sarveshwar Meta Rao, San Jose, CA (US); Soundarya Sivaramakrishnan, San Jose, CA (US); Xin Yao, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 731 days.

(21) Appl. No.: 16/776,887

(22) Filed: Jan. 30, 2020

(65) Prior Publication Data
US 2021/0243159 A1   Aug. 5, 2021

(51) Int. Cl.
*H04L 9/40* (2022.01)
*G16Y 30/10* (2020.01)
*H04L 61/103* (2022.01)

(52) U.S. Cl.
CPC ........ *H04L 63/1466* (2013.01); *H04L 61/103* (2013.01); *H04L 63/0236* (2013.01); *H04L 63/0254* (2013.01); *H04L 63/0876* (2013.01); *H04L 63/1408* (2013.01); *H04L 63/1416* (2013.01); *H04L 63/1425* (2013.01); *G16Y 30/10* (2020.01); *H04L 63/0272* (2013.01)

(58) Field of Classification Search
CPC ... H04L 63/0227–0272; H04L 63/1466; H04L 63/0236; H04L 63/1425; H04L 63/1416; H04L 63/1408; H04L 63/0254; H04L 63/0876; H04L 61/103; G16Y 30/10
See application file for complete search history.

(56) References Cited

U.S. PATENT DOCUMENTS

| | | | |
|---|---|---|---|
| 6,862,286 B1 * | 3/2005 | Tams | H04L 61/2061 370/395.54 |
| 7,533,407 B2 | 5/2009 | Lewis et al. | |
| 7,979,903 B2 * | 7/2011 | Kwan | H04L 63/1408 726/22 |
| 8,520,512 B2 | 8/2013 | Gilde et al. | |

(Continued)

OTHER PUBLICATIONS

Jiang-Whai Dai et al., A New Method to Detect Abnormal IP Address on DHCP, 2007, TENCON 2007—2007 IEEE Region 10 Conference (pp. 1-5) (Year: 2007).*

*Primary Examiner* — Gregory Todd
(74) *Attorney, Agent, or Firm* — Gilliam IP PLLC

(57) ABSTRACT

Leveraging non-transient or persistent device identifiers to enforce device quarantine instead of IP addresses accommodates the transient associations of IP addresses to devices without compromising the effectiveness of quarantine. When a device has been determined to be compromised and is quarantined, the quarantine of the device is enforced using the IP address of the device. However, IP address assignment is transient. With each connection, a device can be assigned a different IP address. After a connection is established, a gateway can collect a device identifying value(s) that persists across network connections (e.g., host identifier (hostid) and device serial number). With a persistent device identifier, a quarantine list can be enforced in a data/forwarding plane regardless of a compromised device being assigned different network addresses.

19 Claims, 6 Drawing Sheets

(56) References Cited

U.S. PATENT DOCUMENTS

| | | | | |
|---|---|---|---|---|
| 8,973,088 B1* | 3/2015 | Leung | ................... | H04L 63/20 |
| | | | | 726/1 |
| 10,333,966 B2 | 6/2019 | Bisiaux et al. | | |
| 10,484,334 B1* | 11/2019 | Lee | ........................ | H04L 67/30 |
| 10,972,503 B1* | 4/2021 | Mohan | ................... | H04L 63/14 |
| 2007/0097976 A1* | 5/2007 | Wood | ................ | H04L 63/1416 |
| | | | | 370/392 |
| 2011/0029775 A1* | 2/2011 | Sakai | ...................... | G06F 21/33 |
| | | | | 713/171 |
| 2016/0315907 A1* | 10/2016 | Nantel | ............. | H04L 29/12028 |
| 2017/0223046 A1* | 8/2017 | Singh | ................ | H04L 63/1491 |
| 2018/0097840 A1* | 4/2018 | Murthy | ................. | H04L 63/02 |
| 2019/0058731 A1* | 2/2019 | Garg | ................. | H04L 63/1466 |
| 2019/0089678 A1* | 3/2019 | Lam | .................... | H04L 63/0263 |
| 2019/0158524 A1* | 5/2019 | Zadeh | ................. | H04L 43/045 |
| 2019/0386957 A1* | 12/2019 | Leon | ..................... | H04L 63/18 |
| 2020/0137084 A1* | 4/2020 | Roy | ................... | H04L 63/0236 |
| 2021/0211402 A1* | 7/2021 | Maarseveen | ........ | H04L 61/5014 |

* cited by examiner

PERSISTENT DEVICE IDENTIFIER DRIVEN COMPROMISED DEVICE QUARANTINE

BACKGROUND

The disclosure generally relates to the G06F class and subclass 21/55.

Network security includes quarantining a device that has been compromised. To quarantine a mobile or remote device that has been compromised, a firewall can prevent the device from connecting to a network protected by the firewall. To prevent connection or to disconnect a compromised device, the firewall uses the Internet Protocol address known to the firewall for the compromised device.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to Internet Protocol addresses as transient identifiers for devices in illustrative examples. However, the disclosed innovation can be applied to other types of transient identifiers or combinations of identifiers relied upon for controlling data traffic, such as tunnel labels or session identifiers. In other instances, well-known instruction instances, protocols, structures and techniques have not been shown in detail in order not to obfuscate the description.

Overview

Leveraging non-transient or persistent device identifiers to enforce device quarantine instead of transient/non identifiers (e.g., Internet Protocol (IP) addresses) accommodates the transient associations of IP addresses to devices without compromising the effectiveness of quarantine. While mobility and telecommuting are almost a necessity in a modern work environment that requires near omnipresent connectivity, this connectivity can introduce a security vulnerability even when using a virtual private network (VPN). When a device has been determined to be compromised and is quarantined, the quarantine of the device is enforced using the IP address of the device. However, IP address assignment is transient. With each connection, a device can be assigned a different IP address. After a connection is established, a gateway can collect a device identifying value(s) that persists across network connections (e.g., host identifier (hostid) and device serial number). With a persistent device identifier, a quarantine list can be enforced in a data/forwarding plane regardless of a compromised device being assigned different network addresses.

Example Illustrations

Figure 1:
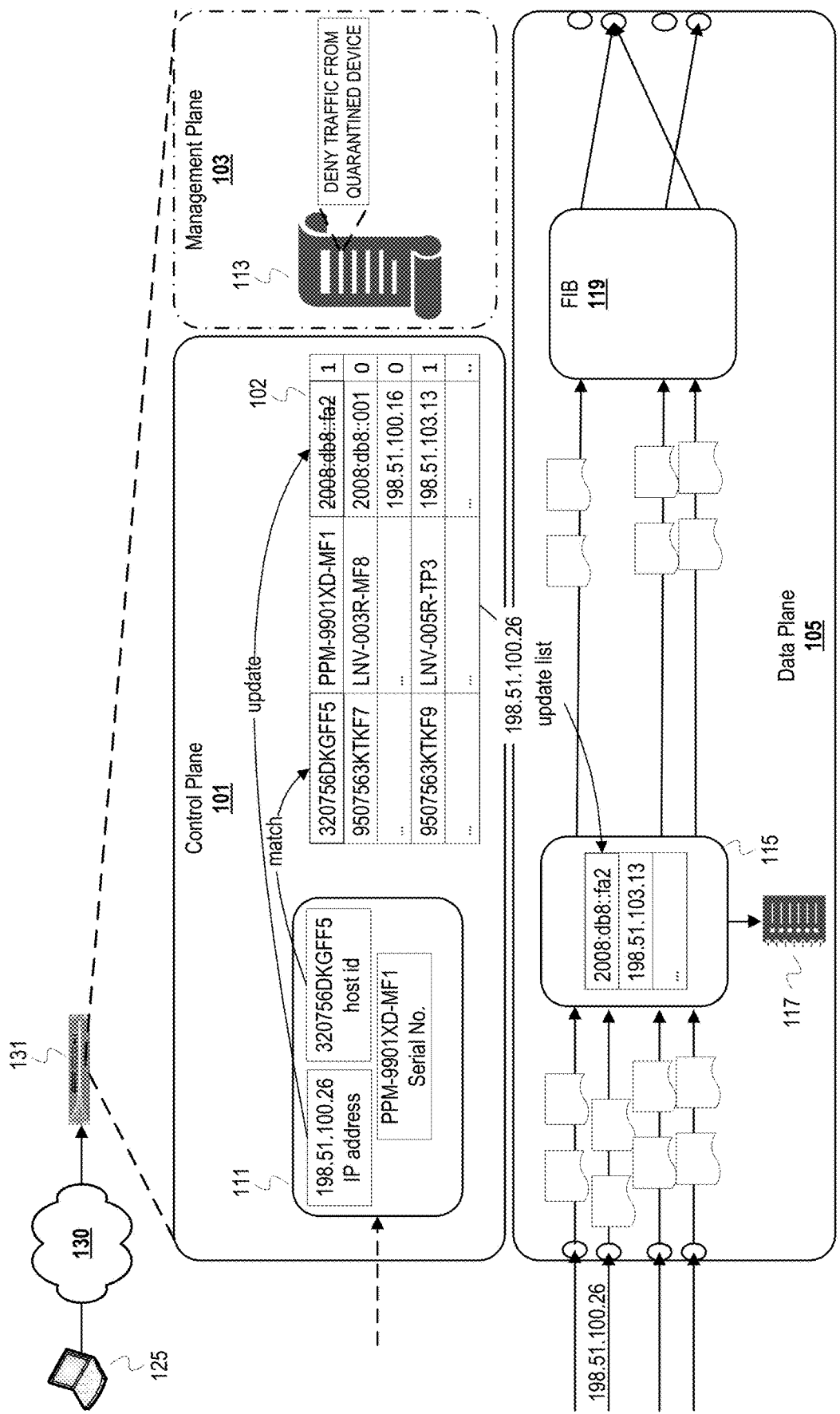
FIG. 1 is a diagram of an intermediary network device with components that adapt associations between persistent device identifiers and transient identifiers for quarantining of compromised devices from a network.

FIG. 1 is a diagram of an intermediary network device with components that adapt associations between persistent device identifiers and transient identifiers for quarantining of compromised devices from a network. FIG. 1 depicts a laptop 125 as an example mobile device that can connect to a network through an intermediary network device 131 (e.g., a network security appliance). The mobile device can instead be a smartphone or what is considered an Internet of Things (IoT) device (e.g., smartwatch) that can establish connections from different locations. The laptop 125 communicates with the intermediary device 131 via a public network 130. The intermediary network device 131 hosts software that organizes into a control plane 101, management plane 103, and a data plane 105.

Each of the planes on the intermediary network device 131 corresponds to different set of responsibilities/functions. The management plane 103 encompasses program code that provides management, monitoring, and configuration services across layers of a network stack implemented on the intermediary device 131. The management and/or configuration services include defining a security policy 113 that includes a rule to deny traffic from a device indicated as quarantined. The management plane 103 provides management and configuration services for managing and configuring hardware of the intermediary network device 131. FIG. 1 depicts the management plane 103 in a dashed line since the management plane 103 may be encompassed by or overlap with the control plane 101. The control plane 101 encompasses the hardware and program code for implementing routing protocols (e.g., route determination, maintaining interface state, etc.) and other services/tasks related to communications with neighbors (e.g., device discovery and topology discovery). The data plane 105 encompasses program code and hardware to forward protocol data units (e.g., packets) from an inbound interface to an outbound interface according to a forwarding information base 119 (FIB) provide by the control plane 103.

A data plane will often include various hardware to reduce if not eliminate delay in forwarding of packets (e.g., applications specific integrated circuits, hardware lookup tables, cache). The data plane 105 includes a quarantine list 115 stored in a cache of the data plane 105. The control plane 101 communicates the quarantine list 115 to the data plane 105 for the data plane 105 to apply and to discard or isolate packets associated with a listed device. FIG. 1 depicts the data plane 105 with a log 117 for the data plane to record information about quarantined packets, although logging of quarantined packets is not necessary.

While the quarantine list 115 identifies devices to quarantine by IP addresses, the control plane 101 maintains a structure 102 that allows the quarantine list 115 to be adapted to the dynamic nature of IP assignments to devices by mapping a transient identifier to at least one persistent identifier ("transient to persistent identifier mapping structure"). The control plane 103 collects information 111 during connection establishment with a requested device. This information 111 includes persistent device identifiers in addition to an IP address. In this illustration, the control plane 101 has collected from the laptop 125 its currently assigned IP address, a hostid, and a serial number. With the information 111, the control plane 101 determines whether the laptop 125 is already identified in the mapping structure 102. The mapping structure 102 is depicted with several entries. Each entry of the mapping structure 102 accommodates two persistent identifiers and one transient identifier for a device. Each entry of the mapping structure 102 also includes a quarantine flag or bit. The quarantine flag is set to "1" to indicate that the device has been determined to be compromised and should be quarantined. When the quarantine flag is set to "0" for a device identified in an entry then the device has not been determined to be compromised. In this case, the control plane 101 determines that the hostid of the laptop 125 matches a persistent identifier of an entry in the mapping structure 102. The control plane 101 then determines that the currently assigned IP address for the laptop 125 does not match the IP address in the matching entry. The control plane 102 updates the entry in the mapping structure 102 to reflect the currently assigned IP address for the laptop 125. Since the quarantine flag is set to "1" in the entry for the laptop 125, the control plane 101 disconnects the laptop 125 from the network associated with the intermediary network device 131 and expedites communicating the update to the data plane 105. The control plane 101 updates the quarantine list 115 or causes the data plane 105 to update the quarantine list 115 to indicate the currently assigned IP address for the laptop 125 instead of the previously assigned IP address. The data plane 105 will then start quarantining packets associated with the currently assigned IP address of the laptop 125.

Figure 2:
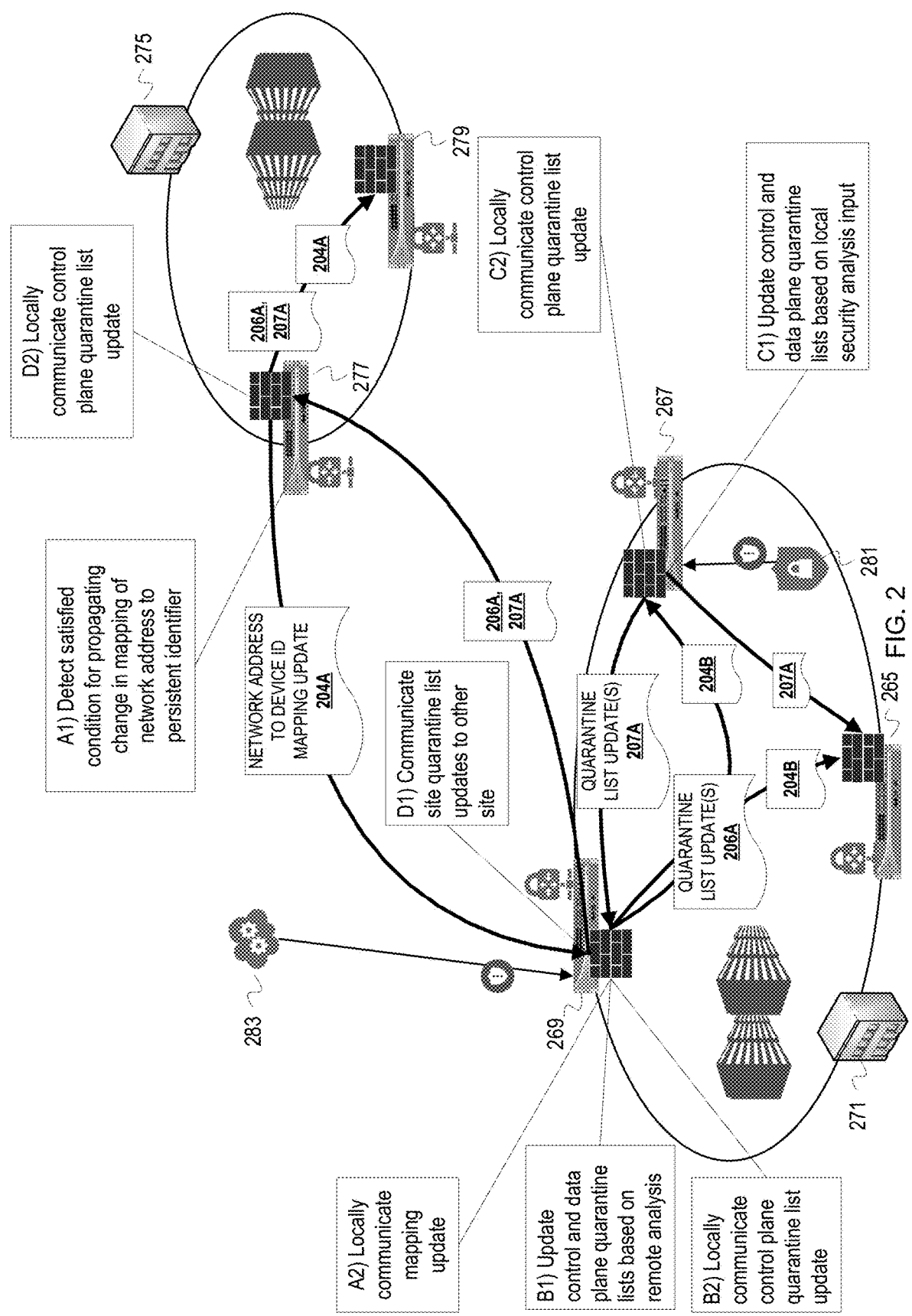
FIG. 2 is a diagram of intermediary network devices propagating transient to persistent identifier updates and quarantine list updates across an enterprise.

FIG. 2 is a diagram of intermediary network devices propagating transient to persistent identifier updates and quarantine list updates across an enterprise. FIG. 2 depicts multiple enterprise sites 271, 275, each with multiple intermediary network devices. The site 275 includes intermediary network devices 277, 279. The site 271 includes the intermediary network devices 265, 267, 269. FIG. 2 depicts each of the intermediary network devices 265, 267, 269, 277, 279 with a firewall and a VPN gateway, although the specific deployment is not necessary. Each of the intermediary network devices 265, 267, 269, 277, 279 includes control plane program code to maintain a mapping structure that maps transient network addresses to persistent device identifiers and communicate updates to either of the quarantine list or the mapping structure across the intermediary network devices. This example illustration presumes that updates are communicated within a site according to a mesh based protocol while updates are communicated between sites between specified site leads. This example illustration presumes that the intermediary network devices 269, 277 have been respectively selected as inter-site distribution points between the sites 271, 275. Stage identifiers indicate example operational stages that can be one or more operations each.

At stage A1, the VPN gateway of the intermediary network device 277 detects that the condition for propagating a change in mapping of a device's network address to a persistent identifier is satisfied. This propagation condition can be set to incremental (communicate each mapping update that occurs) or bulk (accumulate updates until a threshold number of updates have occurred and/or a time period expires). In addition, an expedite or fast path condition can trigger immediate communication of an update regardless of the condition being set to bulk. For example, the condition can be set for the intermediary network device 277 to propagate the earlier of 3 updates occurring or 20 milliseconds expiring since an update occurred within the current time window. However, an additional condition that takes priority can specify that an update in mapping of a device indicated as compromised is to be propagated immediately. Based on detecting that the propagation condition has been satisfied, the intermediary network device 277 communicates a mapping update 204A to the firewall on the local intermediary network device 279 and to the firewall on the intermediary network device 269 at the site 271.

At stage A2, the firewall at the intermediary network device 269 locally communicates the mapping update from the firewall at the intermediary network device 277, as well as any updates made at the intermediary network device 269. The combination of the mapping update 204A and an additional mapping update(s) made at the intermediary network device 269 is depicted as mapping updates 204B. In this small scale illustration, the local communication of mapping updates 204B is to the firewalls at the intermediary network devices 265, 267.

In addition to transient-persistent identifier mapping updates, the intermediary network devices that enforce quarantining of compromised devices rapidly propagate quarantine list updates. This rapid propagation is both between control plane and data plane and across control planes of the intermediary network devices. At stage B1, the firewall at the intermediary network device 269 updates the quarantine list of its control plane (i.e., the mapping structure with quarantine flag) and then the quarantine list in its data plane based on remote analysis identifying one or more compromised devices. A remote analysis service 283 has identified the compromised device(s). The remote analysis service 283 can be a remote analysis engine or service of the enterprise that accesses a large pool of data for the enterprise across the disparate sites (e.g., a data warehouse or data lake of traffic data from multiple sites). The remote analysis service 283 may be a third-party security analysis service that detects compromised devices based on reporting and/or accessed enterprise data. Depending upon the type of remote analysis service, the remote analysis service 283 may identify compromised devices to the firewall at the intermediary network device 269 via a published or shared application programming interface, a data structure or database accessible by the remote analysis service 283 for writing and by the firewall at the intermediary network device 269, etc. At stage B2, the firewall at intermediary network device 269 locally communicates the control plane quarantine list update as update 206A to the firewalls at the intermediary network devices 265, 267. The firewalls at the intermediary network devices 265, 267 internally update their respective quarantine lists.

At stage C1, the firewall at the intermediary network device 267 updates the quarantine list of its control plane and then the quarantine list in its data plane based on local security analysis input. A local security analysis application or service 281 identifies compromised devices to the firewalls local to the site 271 via notifications between applications and/or a management interface. For example, a security operator may have determined a device to be compromised and update the control plane quarantine list via a user interface. As another example, an intrusion detection or endpoint protection agent can identify a compromised device to local firewalls with a file write, database update, etc. At stage C2, the firewall at intermediary network device 267 locally communicates the control plane quarantine list update as update 207A to the firewalls at the intermediary network devices 265, 269. The firewalls at the intermediary network devices 265, 269 internally update their respective quarantine lists.

At stage D1, the firewall at the intermediary network device 269 communicates the quarantine list updates from site 271 to site 275 via the intermediary network device 277. The firewall at the intermediary network device 269 can communicate the quarantine list updates 206A, 207A incrementally or in small time window based batches to satisfy a "rapid" time window (e.g., 5 milliseconds may be defined as a threshold for "rapid" propagation of quarantine list updates between sites). The firewall at the intermediary network device 277 implements the quarantine list updates and then locally communicates the updates 206A, 207A. In this illustration, the local communication is to the intermediary network device 279.

Although the illustration of FIG. 2 is based on a presumption of a mesh communication architecture for update propagation, embodiments are not so limited. Embodiments can utilize a centralized propagator. For instance, a firewall or other program code for propagating updates can maintain a global list (per site or across sites) with identifier mappings and quarantine flags. Each intermediary network device that detects address updates or quarantine/compromised device updates reports the update to the node maintaining the global list. The device/node maintaining the global list propagates these updates upon satisfaction of a propagation condition (e.g., time threshold and/or update accumulation threshold).

Figure 3:
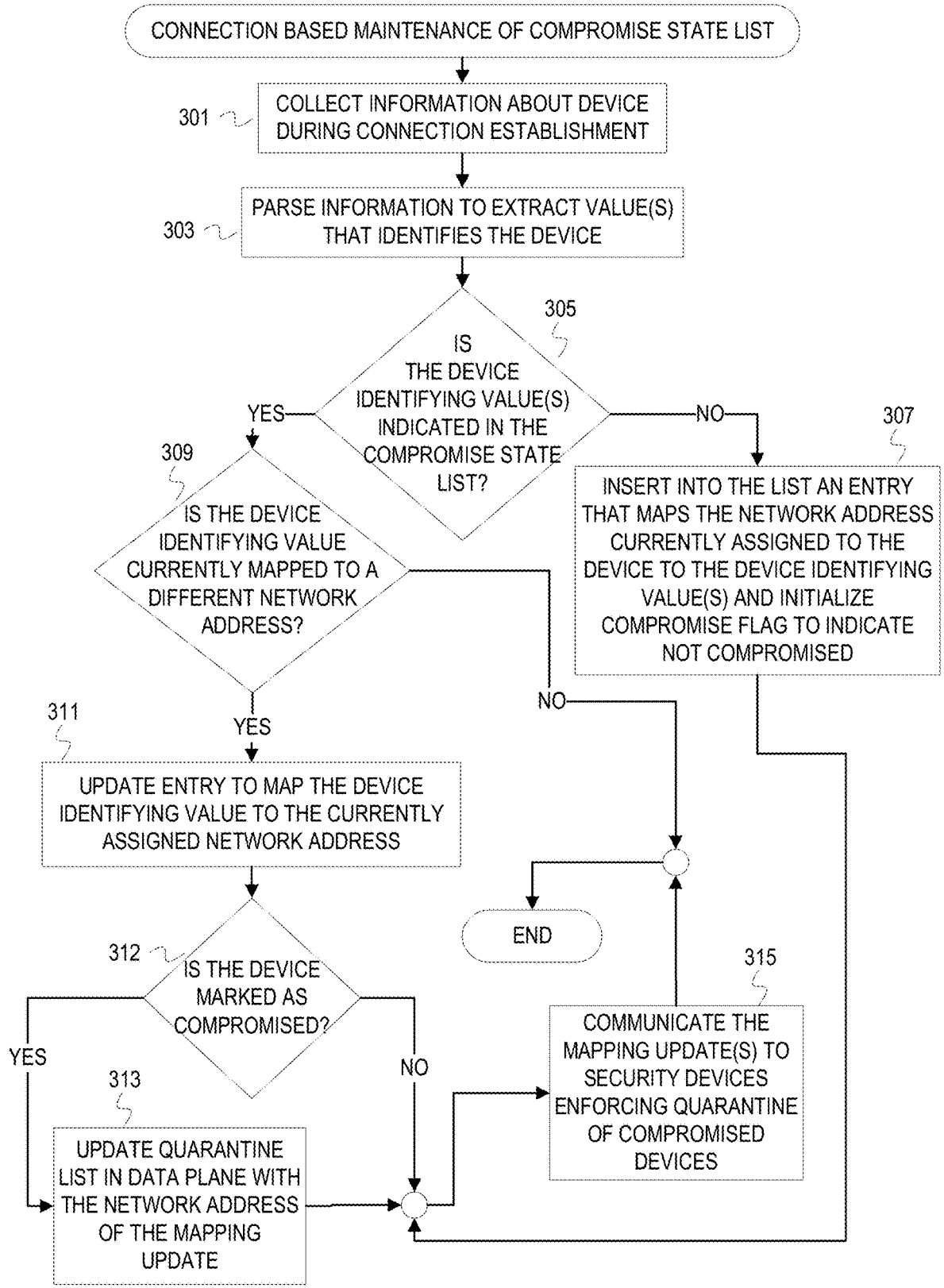
FIG. 3 is a flowchart of example operations for maintaining a compromised state list.

FIG. 3 is a flowchart of example operations for maintaining a compromised state list. The "compromised state list" is a structure with entries that each include a transient identifier, a persistent identifier, and a compromised flag for a device. The compromised flag indicates whether a device has been determined to be compromised or not. This structure can be a hardware lookup table or a data structure in memory. The description of FIG. 3 will refer to a control plane as performing the example operations since the process or service that performs these example operations is encompassed within the control plane regardless of the specific program or application that implements the code for the process or service.

At block 301, the control plane collects information about a device during connection establishment. The control plane extracts or copies a message header(s) of messages received from the device during establishment of a connection or session. In some embodiments, the control plane queries the requesting device for a identifying information. Access to this information and/or responsiveness of the device depends upon the type of device and operating system of the device.

At block 303, the control plane parses the collected information to extract one or more values that identify the device across connections/sessions. The control plane may parse the information based on a known header layout, detection of keywords, detection of tags or field identifiers, etc. Examples of these persistent identifiers include a serial number and a medium access control (MAC) address.

At block 305, the control plane determines whether the device identifying value(s) is already indicated in a compromise state list. The control plane searches the compromise state list with each persistent device identifying value obtained for the connecting device. If no entry includes a matching persistent device identifying value, then flow continues to block 307. If an entry includes a matching persistent device identifying value, flow continues to block 309. For embodiments that map multiple persistent device identifying values ("persistent identifiers"), the control plane can add the additional persistent identifiers to the compromise state list entry if the entry in the compromise state list has some but not all the persistent device identifying values.

At block 307, the control plane inserts an entry into the compromise state list with the persistent identifier and the transient identifier. With the entry, the control associates or maps these identifiers together. For instance, the control plane can set the persistent identifier as a primary key or index into the compromise device list and the transient identifier as an associated identifier. The transient identifier is the network address assigned to the device for the current connection/session. The control plane also initializes the compromise flag to a value indicating that the device has not been determined to be compromised (e.g., set to 0). The flow ends after block 307.

If a match was found, then the control plane determines whether the matching persistent identifier maps to a different network address than the network address currently assigned for the connection, at block 309. After finding the entry in the compromise state list with the matching persistent identifier, the control plane compares the network address mapped to the persistent identifier in the compromise state list with the network address currently assigned to the device. If the network addresses match, then the flow ends.

If the network addresses do not match, then the control plane updates the entry at block 311. The control plane updates the entry with the currently assigned network address, thus mapping the current transient identifier to the persistent identifier.

At block 312, the control plane determines whether the device is marked as compromised in the compromise state list. If the device is marked as compromised, then flow continues to block 313. If not, then flow continues to block 315.

At block 313, the control plane updates a quarantine list in a data plane associated with the control plane. Since the device is flagged as compromised and a security policy has been configured to quarantine traffic of a compromised device, the control plane expeditiously updates the quarantine list with the current network address of the flagged device. The data plane applies the quarantine list to discard or quarantine packets that indicate the current network address in the packet header. The control plane can update the quarantine list or communicate the update to the data plane for the data plane to carry out the update. The update can be performed by overwriting the previous network address with the currently assigned network address; removing the previous network address and inserting the current network address; or outputting all of the transient identifiers in the compromise state list with the compromise flag set and replacing the current data plane quarantine list with this new listing.

At block 315, the control plane communicates the mapping update(s) to security devices configured to enforce quarantining of compromised devices. The control plane communicates this incremental update to facilitate rapid update of the devices to account for quarantine update and/or change in network address assignment. The control plane can maintain a list of peers or neighboring devices that enforce quarantines, and broadcast or individually communicate with those devices. Embodiments may use a lead or primary or central propagation device. In that case, the control plane would communicate the update(s) to the central propagation device which would then propagate to other security devices.

While updates to the quarantine list in the data plane are performed based on changes to the compromise state list in the control plane, there are multiple paths to updating the compromise state list. In addition to updates driven by connection requests, updates can be triggered by connection termination (FIG. 4A), communicated deletion requests FIG. 4B, and detected notifications (FIG. 5). For consistency, FIGS. 4A, 4B, and 5 will be described with reference to the control plane since a process within the control plane will likely perform the operations.

Figure 4A:
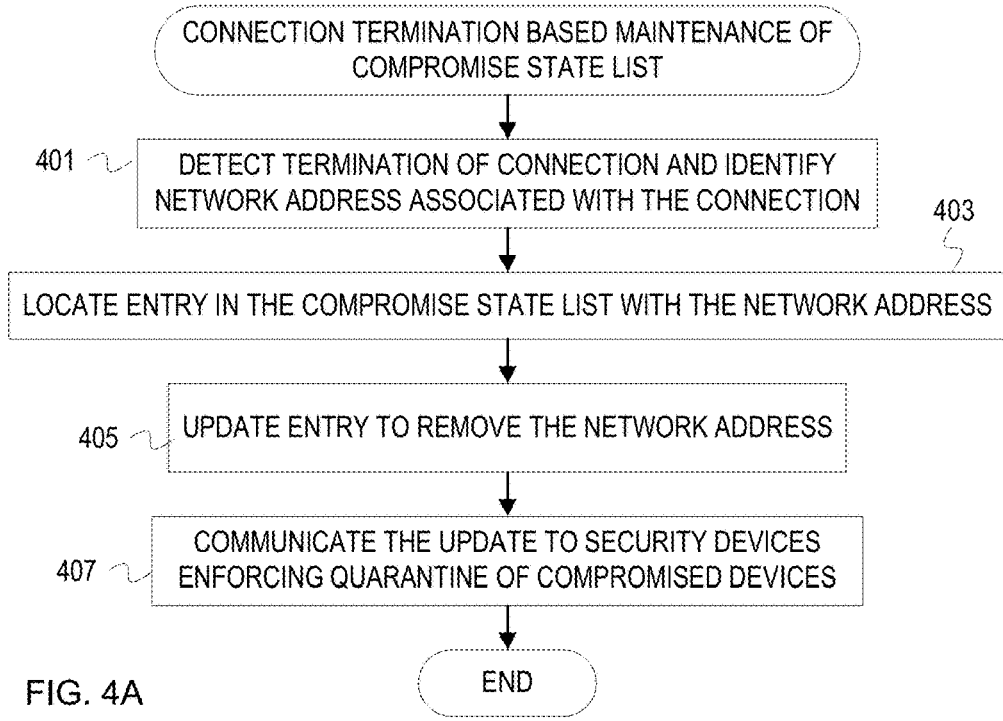
FIG. 4A is a flowchart of example operations for maintaining the compromise state list based on detected connection termination.
Figure 5:
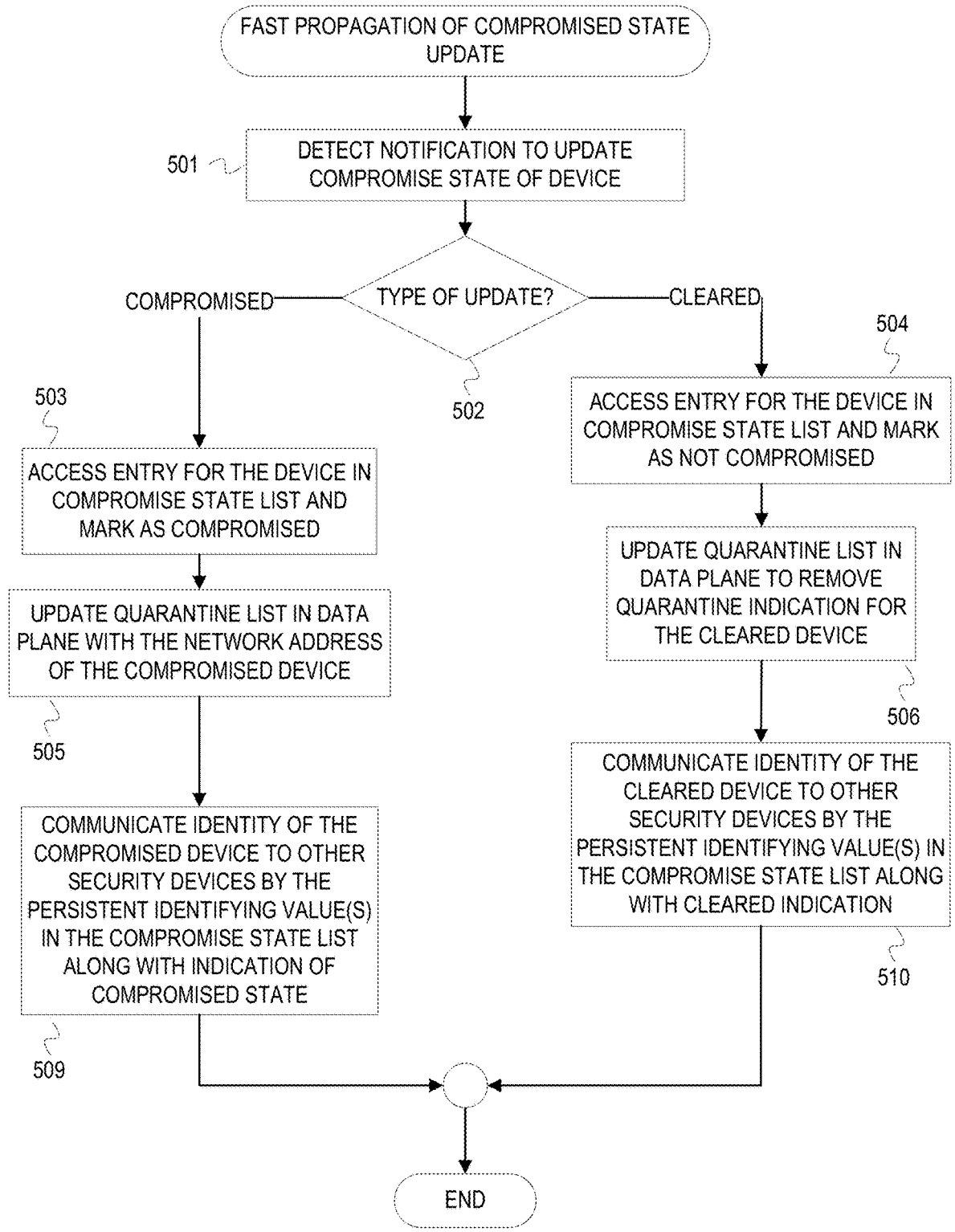
FIG. 5 is a flowchart of example operations for fast propagation of a compromised state update for quarantining the corresponding traffic.

FIG. 4A is a flowchart of example operations for maintaining the compromise state list based on detected connection termination. Since a different network address will likely be assigned to the device disconnecting, the control plane need not preserve the association of a currently assigned network address with a persistent device identifier.

At block 401, the control plane detects termination of a connection. For example, a device may log off of a VPN connection. The control plane determines the network address of the device of the connection being terminated (i.e., the network address associated with the connection being terminated).

At block 403, the control plane locates an entry in the compromise state list with the network address. The compromise state list is structured to allow look ups on a device identifier or a network address. The compromise state list can return contents of the entry or return a confirmation that an entry exists with the network address.

At block 405, the control plane updates the compromise state list to remove the network address. The control plane submits a request or command to clear the network address from the entry. The previously associated persistent device identifier should no longer be associated with a network address.

At block 407, the control plane communicates the mapping update to security devices configured to enforce quarantining of compromised devices. The control plane communicates that the persistent device identifier previously associated with the cleared network address is no longer associated with the network address.

Figure 4B:
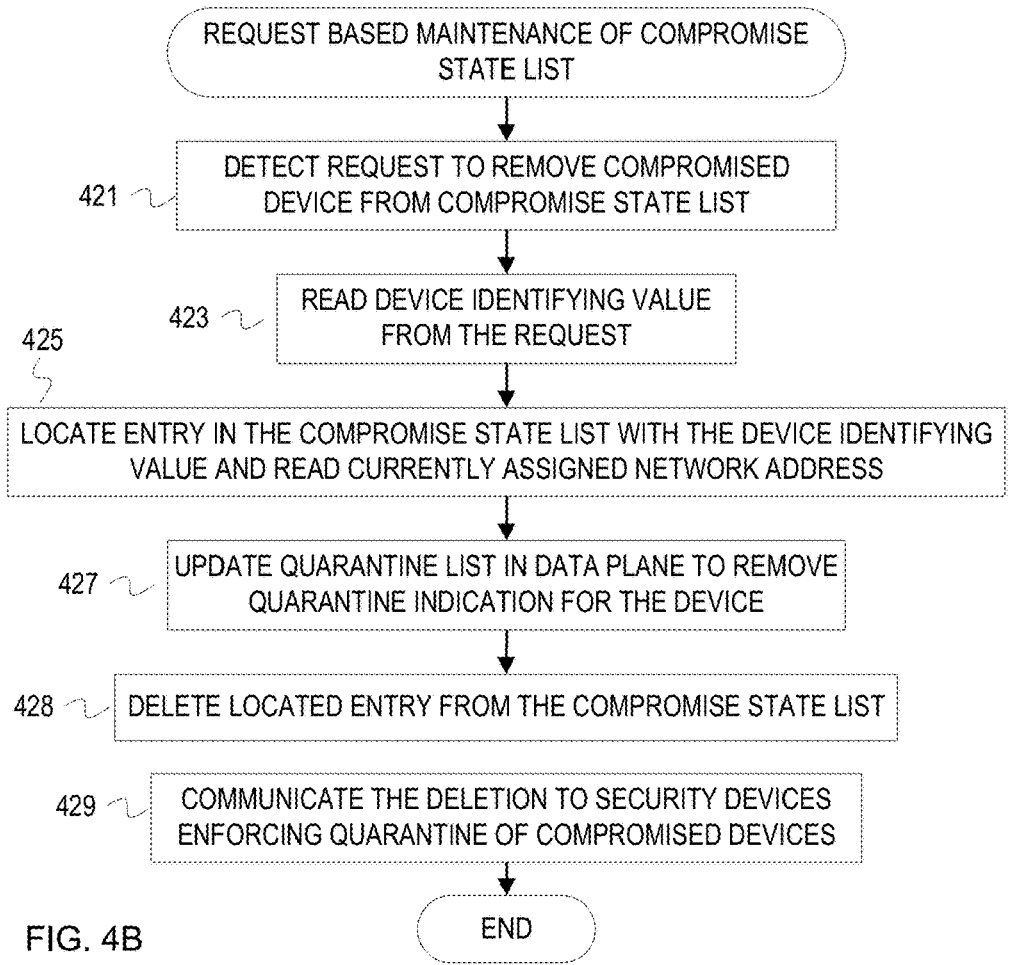
FIG. 4B is a flowchart of example operations for maintaining the compromise state list based on deletion requests.

FIG. 4B is a flowchart of example operations for maintaining the compromise state list based on deletion requests. An administrator can create an explicit request to remove a device from the compromise state list. The device may have been cleared after device scrubbing, the device may have been destroyed, etc. A deletion request may also be triggered from a security policy or configuration.

At block 421, the control plane detects a request to remove a compromised device from the compromised state list. This request may be a message from another process, a command submitted via a graphical user interface, etc.

At block 423, the control plane reads a device identifying value from the request. The deletion request will rely on a persistent device identifier instead of a transient network address.

At block 425, the control plane locates an entry in the compromise state list with the device identifying value. Depending upon how the compromise state list is implemented, the compromise state list can return select contents or all contents of the entry. The control plane reads the returned contents to determine the network address currently assigned or associated with the device identifying value.

At block 427, the control plane updates the quarantine list in the data plane to remove the quarantine indication of the device. The removal of this indication can be implemented differently depending upon implementation of the quarantine list. The quarantine list in the data plane may be a listing of network addresses, in which case the network address would be removed from the data plane quarantine list. In some cases, a flag for the network address in the data plane quarantine list can be cleared or reset.

At block 428, the control plane updates the compromise state list to delete the device as requested. The control plane can submit a request or command to the compromise state list to delete the entry corresponding to the device identifying value read from the deletion request.

At block 429, the control plane communicates the deletion to security devices configured to enforce quarantining of compromised devices. The control plane communicates deletion of the device using the device identifying value.

FIG. 5 is a flowchart of example operations for fast propagation of a compromised state update for quarantining the corresponding traffic. In addition to requests to update compromise date of a device (e.g., administrator requests), a control plane of a security device can detect notifications of compromised state changes for a device. These detected notifications can be determined based on traffic analysis, evaluation of activity logs of devices, etc.

At block 501, the control plane detects a notification of a change in compromised state for a device. A notification can be received from an external source or a process running within the control plane.

At block 502, the control plane determines the type of update. The control plane reads the notification to determine whether the device identified in the notification has been determined to be compromised or was compromised but the security issue has been resolved (i.e., the device is "cleared"). If the update is to a compromised state, then flow continues to block 502. Otherwise, flow continues to block 504.

At block 503, the control plane accesses the entry in the compromise state list corresponding to the device identified in the notification. The control plane marks the entry to indicate the compromised state.

At block 505, the control plane updates the quarantine list in the data plane with the network address of the compromised device. When the control plane accesses the compromise state list to update the compromise state, the control plane reads the transient/network address from the entry or can rely on the notification if the notification includes the transient/network identifier of the compromised device. The control plane updates the quarantine list in the data plane as described with respect to block 403 in FIG. 4.

At block 509, the control plane communicates the identity of the compromised device to other security devices in communication with the control plane along with indication that the device has been determined as compromised. The control plane uses the persistent identifier(s)/identifying value(s) from the compromise state list.

If the update was to a cleared state as determined at block 502, then the control plane proceeds with a similar set of operations as for the compromised state but to clear the device. At block 504, the control plane accesses the entry in the compromise state list corresponding to the device identified in the notification. The control plane marks the entry to indicate that the device is no longer compromised.

At block 506, the control plane updates the quarantine list in the data plane to remove the network address of the cleared device. When the control plane accesses the compromise state list to update the compromise state, the control plane reads the transient/network address from the entry or can rely on the notification if the notification includes the transient/network identifier of the cleared device. If the control plane has access to the memory in the data plane that hosts the quarantine list, then the control plane can remove the network address from the data plane quarantine list.

Otherwise, the control plane can send a request or message to the data plane to remove the network address of the cleared device. Carrying out the removal can vary based on the type of memory hosting the quarantine list in the data plane (e.g., a new list may overwrite the old list if individual entries are not accessible).

At block 510, the control plane communicates the identity of the cleared device to other security devices in communication with the control plane along with an indication that the device has been cleared. The control plane uses the persistent identifier(s)/identifying value(s) from the compromise state list.

The flowcharts are provided to aid in understanding the illustrations and are not to be used to limit scope of the claims. The flowcharts depict example operations that can vary within the scope of the claims. Additional operations may be performed; fewer operations may be performed; etc. For instance, updating the compromise state list to remove information can be performed with a fewer operations than in the example illustrations. For FIG. 4A, blocks 403 and 405 can be implemented with a single command or request to the compromise state list to remove the identified network address. If the network address is not in the compromise state list, then a null value can be returned or error code. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
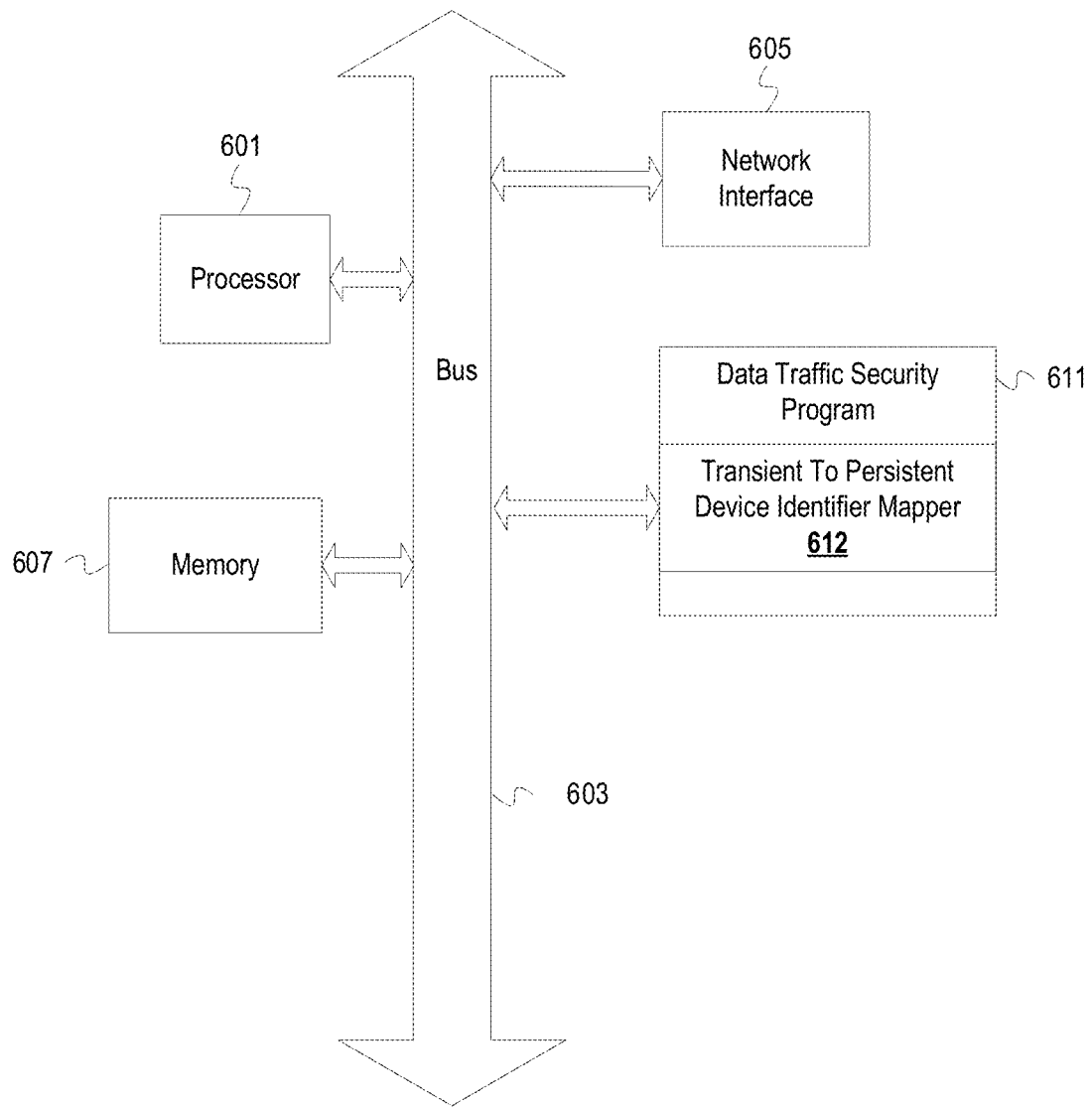
FIG. 6 depicts an example computer system with a data traffic security program that includes a transient-to-persistent identifier mapper.

FIG. 6 depicts an example computer system with a data traffic security program that includes a transient-to-persistent identifier mapper. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes a data traffic security program 611 and a transient-to-persistent device identifier mapper 612. The data traffic security program 611 can be a gateway and/or firewall. The mapper 612 may be a part of the program 611, but may be a separate program invoked by the security program 611. The security program 611 and mapper 612 determine and use persistent device identifiers for compromised device quarantine to allow for the security program 611 to adapt to the transient nature of network addresses which are used for enforcing traffic quarantine in a data plane. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   determining a plurality of identifiers of a first device connecting to a network via an intermediary network device, wherein the plurality of identifiers at least includes a first transient identifier that can change across network connections and a first persistent identifier that persists across network connections;
   determining that the first persistent identifier is indicated in a first structure, wherein the first structure is maintained in a control plane of the intermediary network device and the first structure includes persistent identifiers of devices, transient identifiers assigned to the devices, and a compromised state indicator for each device;
   determining that the first structure indicates the first device as compromised;
   determining that the first persistent identifier for the first device is associated in the first structure with a second transient identifier that is different than the first transient identifier; and
   based on the first device being indicated as compromised and the first persistent identifier for the first device being associated with the second transient identifier in the first structure instead of the first transient identifier, updating a second structure with the first transient identifier, wherein the second structure is maintained in a data plane of the intermediary network device and the data plane enforces quarantine of packets that indicate a transient identifier in the second structure.

2. The method of claim 1 further comprising:
   determining a second plurality of identifiers of a second device connecting to the network via the intermediary network device, wherein the second plurality of identifiers includes a second persistent identifier of the second device and a third transient identifier assigned to the second device;
   determining that the first structure indicates the second persistent identifier associated with a fourth transient identifier instead of the second transient identifier and indicates that the second device is not compromised; and
   based on determining that the second persistent identifier is associated with fourth transient identifier instead of the third transient identifier in the first structure and that the second device is not indicated as compromised in the first structure,
      updating the first structure to associate the second persistent identifier with the third transient identifier instead of the fourth transient identifier without updating the second structure.

3. The method of claim 2 further comprising:
   accumulating the updated association of the second persistent identifier with the third transient identifier for the second device with other updates of identifier associations for devices indicated as not compromised in the first structure;
   determining whether a condition to communicate the accumulated updates to control planes of other intermediary network devices is satisfied; and
   based on a determination that the condition is satisfied, communicating to the control planes of the other intermediary network devices device the accumulated updates.

4. The method of claim 1 further comprising communicating the updated association of the first persistent identifier with the first transient identifier to a second intermediary network device that enforces quarantine of compromised devices.

5. The method of claim 1 further comprising:
   detecting that a compromised state of a second device has changed;
   updating the first structure to indicate the changed compromised state of the second device; and
   updating the second structure in the data plane corresponding to the changed state for the second device.

6. The method of claim 5, wherein the changed compromised state is from not compromised to compromised and updating the second structure comprises determining a current transient identifier assigned to the second device and updating the second structure to indicate the current transient identifier assigned to the second device.

7. The method of claim 5, wherein the changed compromised state is from compromised to not compromised and updating the second structure comprises determining a current transient identifier assigned to the second device and removing from the second structure the current transient identifier assigned to the second device.

8. The method of claim 1, wherein the first transient identifier is a network address and the first persistent identifier is one of a device and a hostid.

9. A non-transitory, machine-readable medium having stored thereon program code to:
   collect device identifiers of devices based on the devices connecting to a network;
   maintain in a control plane mappings of the device identifiers to corresponding network addresses of the devices that connect to the network, wherein the program code to maintain mappings comprises program code to update the mappings to indicate changes in assignments of network addresses to devices;
   set state indicators of whether devices are compromised or not compromised in association with the device identifiers in the mappings;
   propagate, to security devices of the network, changes in mappings based on changes in the network address assignments; and
   limit propagation, from a control plane to a data plane, of changes in assignments of network addresses to those corresponding to devices indicated as compromised according to the state indicators.

10. The non-transitory, machine-readable medium of claim 9, further comprising program code to propagate changes in state indicators to security devices of the network, wherein the program code to propagate the changes in state indicators to security devices uses the device identifiers.

11. The non-transitory, machine-readable medium of claim 9, wherein the program code to collect device identifiers comprises program code to collect device identifiers that persist across connections or session from headers of packets or messages corresponding to establishing a connection or session.

12. The non-transitory, machine-readable medium of claim 9, wherein the program code to limit propagation of changes in assignments of network addresses from the control plane to the data plane comprises program code to determine whether a change in mapping occurs for a device indicated as compromised and to update the data plane to identify the compromised device for quarantine with a currently assigned network address instead of a previously assigned network address.

13. An apparatus comprising:
a control plane and a data plane; and
a machine-readable medium having instructions stored thereon that are executable by a processor of the control plane to cause the control plane to,
   determine a plurality of identifiers of a first device connecting to a network via the apparatus, wherein the plurality of identifiers at least includes a first transient identifier that can change across network connections and a first persistent identifier that persists across network connections;
   determine whether the first persistent identifier is indicated in a first structure that is maintained in the control plane, wherein the first structure includes mappings of persistent identifiers to transient identifiers and indications of a compromised state for each device represented in the first structure;
   based on a determination that the first persistent identifier is indicated in the first structure, determine whether the first device is indicated as compromised in the first structure and whether the first persistent identifier for the first device is associated in the first structure with a different transient identifier than the first transient identifier; and
   based on a determination that the first persistent identifier is associated with a different transient identifier than the first transient identifier in the first structure and that the first device is indicated as compromised in the first structure, update a second structure in the data plane with the first transient identifier, wherein the data plane enforces quarantine of packets that indicate a transient identifier in the second structure.

14. The apparatus of claim 13, wherein the machine-readable medium further comprises instructions executable by the processor to cause the apparatus to:
   based on a determination that the first persistent identifier is associated with a different transient identifier for the first device in the first structure and that the first device is not indicated as compromised in the first structure, update the first structure to associate the first persistent identifier with the first transient identifier instead of the different transient identifier.

15. The apparatus of claim 14, wherein the machine-readable medium further comprises instructions executable by the processor to cause the apparatus to:
   update accumulated updates of identifier mappings with the updated association of the first persistent identifier with the first transient identifier;
   determine whether a condition to communicate the accumulated updates to a set of one or more intermediary network devices is satisfied; and
   based on a determination that the condition is satisfied, communicate to the set of one or more intermediary network devices the accumulated updates.

16. The apparatus of claim 13, wherein the machine-readable medium further comprises instructions executable by the processor to cause the apparatus to communicate the update of association of the first persistent identifier with the first transient identifier to an intermediary network device that enforces quarantine of compromised devices.

17. The apparatus of claim 13, wherein the machine-readable medium further comprises instructions executable by the processor to cause the apparatus to:
   based on a notification that a compromised state of a second device has changed, update the first structure to indicate the changed compromised state of the second device; and
   update the second structure in the data plane to indicate the changed state for the second device.

18. The apparatus of claim 17, wherein the changed compromised state is from not compromised to compromised and the instructions to update the second structure comprise instructions to determine a current transient identifier assigned to the second device and to update the second structure to indicate the current transient identifier assigned to the second device.

19. The apparatus of claim 17, wherein the changed compromised state is from compromised to not compromised and the instructions to update the second structure comprise instructions to determine a current transient identifier assigned to the second device and to remove from the second structure the current transient identifier assigned to the second device.

* * * * *